United States Patent [19]

Shoji et al.

[11] 4,454,052
[45] Jun. 12, 1984

[54] LIQUID ABSORBENT FOR ABSORPTION TYPE REFRIGERATOR

[75] Inventors: Mitsuyoshi Shoji, Ibaraki; Etsuo Oe; Yoshiharu Honma, both of Hitachi; Shigeki Komatsuzaki, Mito; Moriichi Sato; Ren Ito, both of Hitachi, all of Japan

[73] Assignee: Hitachi, Ltd., Tokyo, Japan

[21] Appl. No.: 342,794

[22] Filed: Jan. 26, 1982

[30] Foreign Application Priority Data

Jan. 28, 1981 [JP] Japan ................... 56-10168

[51] Int. Cl.$^3$ .............................................. C09K 5/04
[52] U.S. Cl. ........................................ 252/68; 252/67
[58] Field of Search ..................... 252/67, 68, 69, 78.5

[56] References Cited

U.S. PATENT DOCUMENTS 4,072,027 2/1978 Berenbaum et al. .................. 62/112

FOREIGN PATENT DOCUMENTS 54-152257 11/1979 Japan .
56-070082 6/1981 Japan .
927762 6/1963 United Kingdom .

OTHER PUBLICATIONS

*The Condensed Chemical Dictionary*, 8th Edition, Revised by Gessner G. Hawley, Van Norstrand Reinhold Co., New York, pp. 141 and 854, 1971.

*Primary Examiner*—John E. Kittle
*Assistant Examiner*—José G. Dees
*Attorney, Agent, or Firm*—Antonelli, Terry & Wands

[57] ABSTRACT

A stabilized absorption composition comprising (a) a halogenated hydrocarbon refrigerant, (b) a liquid absorbent of a polyethylene glycol methyl ether and (c) at least one stabilizer selected from phosphite esters, epoxy compounds and organotin compounds is excellent in stability and can be used for an absorption type refrigerator for a long period of time without causing corrosion.

20 Claims, No Drawings

LIQUID ABSORBENT FOR ABSORPTION TYPE REFRIGERATOR

BACKGROUND OF THE INVENTION

This invention relates to a stabilized absoption composition including a novel liquid absorbent for absorption type refrigerators, which absorbent is stable against the halogenated hydrocarbon type refrigerants in the absorption type refrigerators and also little corrosive on metals.

The mechanical compression type refrigerators have gained ground and spread widely since the 1940's with the improvement of working precision of the machines. Recently, however, in order to meet the growing request for utilization of solar heat or waste heat, attention is again being given to the absorption type refrigerators using a halogenated hydrocarbon type refrigerant.

Generally, in the absorption type refrigerators, a closed circuit containing an absorbent is adopted and a liquid halogenated hydrocarbon type refrigerant evaporates in an evaporator constituting a part of said circuit to drive out heat from the surrounding to thereby effect cooling. The vapor of said halogenated hydrocarbon type refrigerant contacts with and is absorbed into the low-concentration liquid absorbent in an absorber and the resultantly formed high-concentration absorbent is sent into a generator where said absorbent is heated by an external heat source to release vapor of the halogenated hydrocarbon type refrigerant. This vapor is condensed by a condenser and again flows into the evaporator. On the other hand, the low-concentration absorbent formed by releasing vapor of the halogenated hydrocarbon refrigerant again returns into the absorber and absorbs vapor of the halogenated hydrocarbon type refrigerant.

In such absorption type refrigerators where a halogenated hydrocarbon is used as refrigerant, use of a furan compound as an absorbent is proposed (U.S. Pat. No. 4,072,027). But the furan compounds are not suited for practical use as they are expensive and hardly available commercially. It is also proposed to use as absorbent a polyethylene glycol methyl ether type compound which has a very high absorbing capacity (Japanese Patent Appln. Kokai (Laid-Open) Nos. 55849/79 and 152257/79). However, when such polyethylene glycol methyl ether type compound is used as absorbent, there arises a problem of poor stability of the system wherein the halogenated hydrocarbon type refrigerant, a metal which forms a refrigerator and said absorbent coexist, and also a metal corroding reaction may occur as said absorbent contracts with $Fe_2O_3$ formed on the surface of the surrounding iron type metal material during operation of the refrigerator. For example, when monochlorodifluoromethane is used as the halogenated hydrocarbon type refrigerant, the following reaction takes place:

$6CHClF_2 + Fe_2O_3 \rightarrow 3CHF_3 + 3CO + FeF_3 + 3HCl$

As a result, iron halide is produced on the metal surface. There is also produced hydrogen chloride which is a corrosive element on the metal surface also promotes deterioration of the absorbent itself. This reaction is accelerated in the presence of water, and such a reaction also occurs when using other halogenated hydrocarbon type refrigerants. As for stabilizers for improving such metal corrosion, no report on studies has been made at present. Although the use of phosphite esters is disclosed in the above-mentioned U.S. Pat. No. 4,072,027 but said U.S. patent is quite silent on and gives no suggestion whether the phosphite esters are effective for a composition including a halogenated hydrocarbon as a refrigerant and an ethylene glycol series absorbent. The halogenated hydrocarbon type refrigerant to be used in this invention is of the type which has a boiling point of from $-40°$ to $+25°$ C., but when the absorption type refrigerator is operated by using as absorbent a polyethylene glycol methyl ether type compound of the general formula: $CH_3-O-(C_2H_4-O)_n R$ (I) (wherein n is an integer of 1 to 6, and R is H, $CH_3-$ or $CH_3CO-$), remarkable corrosion occurs on the metal surface of the generator. Therefore, establishment of certain anticorrosive means is essential for the practical use of said absorption type refrigerator for a long period of time.

SUMMARY OF THE INVENTION

As a result of extensive studies, the present inventors found that said corrosion of metal can be prevented by adding a specific stabilizer to the absorbent composed of a polyethylene glycol methyl ether type compound of the following general formula:

$$CH_3-O-(C_2H_4-O)_n R \qquad (I)$$

wherein n is an integer of 1 to 6, and R is H, $CH_3-$ or $CH_3CO-$, and attained the present invention.

Thus, an object of this invention is to provide a stabilized absorption composition including a liquid absorbent for absorption type refrigerators, which absorbent is stable against the halogenated hydrocarbon type refrigerant used in the refrigerator and also little corrosive on metals.

This invention provides a stabilized absorption composition comprising (a) halogenated hydrocarbon as a refrigerant, (b) a polyethylene glycol methyl ether type compound represented by the general formula:

$$CH_3-O-(C_2H_4-O)_n R \qquad (I)$$

wherein n is an integer of 1 to 6, and R is H, $CH_3-$ or $CH_3CO-$, as absorbent, and (c) at least one stabilizer selected from the group consisting of phosphite esters, epoxy compounds and organotin compounds.

DESCRIPTION OF THE PREFERRED EMBODIMENTS

The polyethylene glycol methyl ethers of the formula (I) are usable as absorbent in this invention, but among these compounds, those of the formula (I) wherein n is 2 to 5 and R is $CH_3$ are preferred. As typical examples of such polyethylene glycol methyl ethers, the following may be cited: diethylene glycol monomethyl ether acetate, diethylene glycol dimethyl ether, triethylene glycol dimethyl ether, ethylene glycol monomethyl ether acetate, pentaethylene glycol dimethyl ether, triethylene glycol monomethyl ether, tetraethylene glycol monomethyl ether and pentaethylene glycol monomethyl ether. These ethers may be used either singly or as a mixture thereof.

Aliphatic phosphite esters may be used as stabilizer in this invention, and as examples of such aliphatic phosphite esters, one may cite the following: trimethyl phosphite, triethyl phosphite, tripropyl phosphite, tributyl phosphite, tripentyl phosphite, trihexyl phosphite, triheptyl phosphite, tris(2-ethylhexyl) phosphite, triisooctyl phosphite, tridecyl phosphite, trilauryl phosphite, trimyristyl phosphite, tricetyl phosphite, tristearyl phosphite, trioleyl phosphite, distearylpentaerythritol diphosphite, diisodecylhydrogen phosphite, dilaurylhydrogen phosphite, dioleylhydrogen phosphite, diisodecylpentaerythritol diphosphite, etc.

Aromatic phosphite esters may be also used as stabilizer in this invention. Examples of such aromatic phosphite esters are diphenylisodecyl phosphite, triphenyl phosphite, tris(4-phenylphenol) phosphite, tris(nonylphenyl) phosphite, diphenyl(tridecyl) phosphite, tricresyl phosphite, phenyldiisooctyl phosphite, diphenylnonylphenyl phosphite, phenylisodecyl phosphite, trixylenyl phosphite, phenyldiisodecyl phosphite, tris(cyclohexylphenyl) phosphite, diphenyl phosphite, diphenylnonyl phosphite, di(nonylphenyl)nonyl phosphite, tetraphenyldipropylene glycol diphosphite, etc.

These phosphite esters may be used either singly or as a mixture thereof.

As the epoxy compounds also usable as stabilizer in this invention, there may be cited, for example, bis(2,3-epoxycyclopentyl) ether, 2,2-bis(3,4-epoxycyclohexyl)-propane, 1-phenoxy-2,3-epoxypropane, 1,2,5,6-diepoxy-4,7-hexahydromethanoindane, 2-(3,4-epoxy)cyclohenxyl-5,5-spiro(3,4-epoxy)-cyclohexane-m-dioxane, 1,2-bis[5-(1,2-epoxy)-4,7-hexahydromethaneoxyl]ethane, 1,2-bis[5-(1,2-epoxy)-4,7-hexahydromethanoindaneoxyl]methane, 3,4-epoxy-6-methyl-cyclohexylmethyl-3,4-epoxy-6-methyl-cyclohexyanecarboxylate, 3,4-epoxycyclohexamethyl-(3,4-epoxy)cyclohexane carboxylate, phenylglycidyl ether, 1,4-butanediolglycidyl ether, allylglycidyl ether, p-t-butylenyl-2,3-epoxypropyl ether, 2,3-epoxypropyl-p-methoxyphenyl ether, butylene oxide, 1-epoxyethyl-3,4-epoxycyclohexane, and the like. These epoxy compounds can be used alone or as a mixture thereof. Among these epoxy compounds, those having a glycidyl ether group and butylene oxide are more preferred.

Organotin compounds are further usable as stabilizer in this invention, and the examples of such organotin compounds include tetraethyltin, tetrabutyltin, tertraphenyltin, dibutyldisalicyltin, di-n-octyltin malate, di-n-octyltin laurate, di-n-octyltin dilaurate, di-n-octyltinbis(2-ethylhexyl) malate, dibutyltin malate, dibutyltin laurate, dibutyltin dilaurate epoxy, dibutyltin diacetate, dibutyltindiisooctyl malate, dibutyltin dilaurate, etc. These organotin compounds can be used alone or as a mixture thereof.

The above-said three types of stabilizer compounds may be used as a mixture thereof.

Said stabilizer is preferably added in an amount of 0.1 to 5% by weight based on the total weight of the absorbent and the stabilizer. If the amount of the stabilizer is too small, for example less than 0.1% by weight, there is provided no satisfactory chlorine capturing capacity, while if said amount is too large, for example greater than 5% by weight, such stabilizer may be reacted with the absorbent (halogenated hydrocarbons) to lose its stabilizing effect.

As mentioned above, the refrigerant to be used in this invention is selected from the halogenated hydrocarbons having a boiling point of from −40° to +25° C., and as such halogenated hydrocarbons, the following may be named; trichloromonofluoromethane, dichlorodifluoromethane, 1,1,1,2-tetrafluoroethane, monochlorodifluoromethane, dichloromonofluoromethane, monochloromonofluoromethane, monochloromethane, 1,1-difluoromethane, 1,2-dichlorotetrafluoroethane, 1,1-dichlorotetrafluoroethane, monochloroethane, monochloropentafluoroethane, hexafluoropropane, octafluorocyclobutane, 1-chloro-1,1,2,2-tetrafluoroethane, hexafluorocyclobutane, etc.

The invention is further described hereinbelow by way of Examples, but it is to be understood that the scope of the invention is not restricted in any way by these Examples. Stability of the absorbent against the halogenated hydrocarbon type refrigerants and metal corrosiveness were evaluated by using the sealed tube testing method which is a standard method of this type of evaluation. The test was conducted as follows. 0.5 Ml of a liquid absorbent and 0.5 ml of a halogenated hydrocarbon refrigerant were put into a glass tube of 6 mm in inner diameter and 3 mm in thickness, and as the metal test material, an iron sheet (SM 41, measuring 40 mm in length, 1 mm in thickness and 4 mm in width) was placed in said tube. After sealing the tube, it was heated at 180° C. for 500 hours, and coloration of the absorbent and the corroded condition of the iron sheet were examined and also the amount of Cl−, which is the decomposition product of the halogenated hydrocarbon refrigerant, was measured. The measurement of the amount of Cl− was made according to "Determination of inorganic chlorides in oil" prescribed in JIS-C-2321, involving titration with an AgNO$_3$ solution.

EXAMPLE 1

An iron sheet was placed in each of mixed solutions of tetraethylene glycol dimethyl ether (absorbent) and monochlorodifluoromethane (refrigerant) added with 0.5% by weight of various types of phosphite ester (stabilizer), and said solution was heated in a sealed tube at 180° C. for 500 hours and the resulting discoloration of the absorbent, amount of Cl− produced and discoloration of the iron sheet were examined. The results are shown in Table 1.

TABLE 1

| Stabilizer | Absorbent (tetraethylene glycol dimethyl ether) after test | | Discoloration of iron sheet |
|---|---|---|---|
| | Discoloration | Amount of Cl− produced ($\times 10^{-3}$ mg) | |
| Distearylpentaerythritol diphosphite | Light yellow | 7 | No change of color |
| Trihexyl phosphite | " | 5 | No change of color |
| Triisooctyl phosphite | " | 4 | No change of color |
| Tridecyl phosphite | " | 8 | No change of color |
| Trilauryl phosphite | " | 4 | No change of color |

TABLE 1-continued

| Stabilizer | Absorbent (tetraethylene glycol dimethyl ether) after test | | Discoloration of iron sheet |
|---|---|---|---|
| | Discoloration | Amount of Cl$^-$ produced ($\times 10^{-3}$ mg) | |
| Tris(4-phenylphenol) phosphite | " | 6 | No change of color |
| Tris(nonylphenyl) phosphite | " | 5 | No change of color |
| Diphenylnonylphenyl phosphite | " | 3 | No change of color |
| Tetraphenyldipropylene glycol diphosphite | " | 7 | No change of color |
| Di(nonylphenyl)nonyl phosphite | " | 5 | No change of color |
| None | Brown | 1,358 | Blackened |

As seen from Table 1, the absorbents added with a phosphite ester suffered little discoloration and were also very limited in generation of Cl$^-$. Further, the metal surface remained unchanged in color and was almost free of corrosion.

EXAMPLE 2

An iron sheet was placed in each of the mixed solutions of tetraethylene glycol dimethyl ether (absorbent) and monochlorodifluoromethane (refrigerant) added with 0.5% by weight of various types of epoxy compound (stabilizer), and each said solution was heated in a sealed tube at 180° C. for 500 hours and the discoloration of the absorbent, amount of Cl$^-$ generated and color change of the iron sheet was examined. The results are shown in Table 2.

TABLE 2

| Stabilizer | Absorbent (tetraethylene glycol dimethyl ether) after test | | Discoloration of iron sheet |
|---|---|---|---|
| | Discoloration | Amount of Cl$^-$ generated ($\times 10^{-3}$ mg) | |
| Bis(2,3-epoxycyclopentyl) ether | Light yellow | 45 | Partly discolored to brown |
| 2,2-Bis(3,4-epoxycyclohexyl)propane | " | 23 | Partly discolored to brown |
| 1,2-Bis[5-(1,2-epoxy)-4,7-hexahydromethanoinoxyl]methane | " | 20 | Partly discolored to brown |
| 1-Epoxyethyl-3,4-epoxycyclohexane | " | 29 | Partly discolored to brown |
| Phenylglycidyl ether | " | 4 | No change of color |
| 1,4-Butanediolglycidyl ether | " | 3 | No change of color |
| Allylglycidyl ether | " | 5 | No change of color |
| Butylene oxide | " | 2 | No change of color |

As is clear from Table 2, the discoloration of the absorbent, generation of Cl$^-$ and color change of the iron sheet are all very limited or null in case of adding an epoxy compound, too, thus showing the effect of the epoxy compounds as stabilizer in the composition of this invention.

EXAMPLE 3

An iron sheet was placed in each of mixed solutions of tetraethylene glycol dimethyl ether (absorbent) and monochlorodifluoromethane (refrigerant) added with 0.5% by weight of various types of organotin compounds (stabilizer), and each said solution was heated in a sealed tube at 180° C. for 500 hours and the resulting discoloration of the absorbent, amount of Cl$^-$ generated and color change of the iron sheet were examined, obtaining the results shown in Table 3.

TABLE 3

| Stabilizer | Absorbent (tetraethylene glycol dimethyl ether) after test | | Discoloration of iron sheet |
|---|---|---|---|
| | Discoloration | Amount of Cl$^-$ generated ($\times 10^{-3}$ mg) | |
| Dibutyltin diacetate | Light yellow | 85 | Slightly discolored to gray |
| Tetrabutyltin | Light yellow | 11 | No change of color |
| Dibutyldisalicyltin | Light yellow | 9 | No change of color |
| Tetraphenyltin | Light yellow | 9 | No change of color |
| Dibutyltin laurate | Light yellow | 21 | No change of color |
| Dibutyltin dilaurate | Light yellow | 27 | No change of color |
| None | Brown | 1,358 | Blackened |

As noted from Table 3, all of the absorbents added with an organotin compound showed little discoloration, were limited in generation of Cl$^-$ and caused no or only a slight discoloration of the metal surface. These attest the effect of the organotin compounds as stabilizer in the composition of this invention.

EXAMPLE 4

An iron sheet was placed in each of the mixed solutions of difluoromonochloromethane (refrigerant) and six types of compounds (absorbent) represented by the general formula: $CH_3—O\text{-}(CH_2CH_2—O)_nX$ (wherein n is a number of 3 or greater, and X is hydrogen atom or a methyl group) added with 0.5% by weight of tris(nonylphenyl) phosphite (stabilizer), and each said solution was heated in a sealed tube at 180° C. for 500 hours and the resulting discoloration of the absorbent, amount of $Cl^-$ generated and discoloration of the iron sheet were examined. The results are shown in Table 4.

TABLE 4

| Absorbent | Absorbent after test Discoloration | Amount of $Cl^-$ generated ($\times 10^{-3}$ mg) | Discoloration of iron sheet |
|---|---|---|---|
| Triethylene glycol dimethyl ether | Light yellow | 4 | No discoloration |
| Tetraethylene glycol dimethyl ether | " | 5 | No discoloration |
| Pentaethylene glycol dimethyl ether | " | 5 | No discoloration |
| Triethylene glycol monomethyl ether | " | 10 | No discoloration |
| Tetraethylene glycol monomethyl ether | " | 11 | No discoloration |
| Pentaethylene glycol monomethyl ether | " | 9 | No discoloration |

As seen from Table 4, in case tris(nonylphenyl) phosphite is added in said various types of absorbents, each of the absorbents is limited in discoloration and generation of $Cl^-$ and also each mixed solution causes no discoloration of the metal surface, which indicates the effect of said stabilizer in the composition of this invention.

EXAMPLE 5

An iron sheet was placed in each of the three types of mixed solutions consisting of tetraethylene glycol dimethyl ether (absorbent) added with 1.0% by weight of tris(nonylphenyl) phosphite (stabilizer) and difluorodichloromethane, monofluorodichloromethane or monofluorotrichloromethane (refrigerant), and each said mixed solution was heated in a sealed tube at 180° C. for 500 hours and the resulting discoloration of the absorbent, amount of $Cl^-$ generated and discoloration of the iron sheet were examined. The results are shown in Table 5.

TABLE 5

| Refrigerant | Absorbent after test Discoloration | Amount of $Cl^-$ generated ($\times 10^{-3}$ mg) | Discoloration of iron sheet |
|---|---|---|---|
| Difluorodichloromethane | Light yellow | 12 | No discoloration |
| Monofluorodichloromethane | Light yellow | 8 | No discoloration |
| Monofluorotrichloromethane | Light yellow | 14 | No discoloration |

As is clear from Table 5, in case tris(nonylphenyl) phosphite is added in the absorbent, the solution causes no corrosion nor discoloration of the metal surface regardless of the type of the refrigerant blended. From this, the effect of addition of the stabilizer is clear.

EXAMPLE 6

Tetraethylene glycol dimethyl ether was used as absorbent, and to this absorbent was added 0.5% by weight of tris(nonylphenyl) phosphite as stabilizer. Also, monochlorodifluoromethane was used as halogenated hydrocarbon type refrigerant. The effect of the stabilizer in case of using this mixed absorbent solution in an absorption type refrigerator was compared with that of a similar absorbent solution not added with tris(nonylphenyl) phosphite. The absorption type refrigerator (with a capacity of 10 tons of refrigeration) used was operated under the following conditions. These conditions are merely intended to be illustrative and not restrictive to the present invention.

Said absorption type refrigerator was operated by controlling the refrigerant vapor temperature in this evaporator at 5° C., the absorbent temperature in the absorber at 45° C., the absorbent temperature in the generator at 130° C. and the liquid refrigerant temperature in the condenser at 45° C. The pressure on the side of the generator and condenser under said temperature conditions was 18 kg/cm² and the pressure on the side of the evaporator and absorber was 5 kg/cm². When said refrigerator was operated under these conditions continuously for 500 hours, in case of using the liquid absorbent added with 0.5% by weight of tris(nonylphenyl) phosphite, the iron type wall surface in the generator remained free of any corrosion and the amount of $Cl^-$ generated was as small as $0.01 \times 10^{-3}$ mg, but in case of using the absorbent solution not added with tris(nonylphenyl) phosphite, the iron type wall surface in the absorption type refrigerator discolored to liver brown and also $Cl^-$ was generated in an amount as large as $0.023 \times 10^{-3}$ mg. These results show the inhibitory effect of the liquid absorbent of this invention against metallic corrosion even when said liquid absorbent is used in an absorption type refrigerator.

As described above, the liquid absorbent for absorption type refrigerator according to this invention is stable and highly effective for arresting metal corrosion, and thus it is useful as absorbent for the absorption type refrigerators where a halogenated hydrocarbon is used as refrigerant.

What is claimed is:

1. A stabilized absorption composition comprising
   (a) a halogenated hydrocarbon as refrigerant,
   (b) a polyethylene glycol methyl ether represented by the formula:

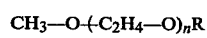

wherein R is hydrogen, CH₃— or CH₃CO—; and n is an integer of 1 to 6, as absorbent, and
(c) at least one stabilizer selected from the group consisting of phosphite esters, epoxy compounds and organotin compounds.

2. A composition according to claim 1, wherein the stabilizer is at least one phosphite ester.

3. A composition according to claim 1, wherein the stabilizer is at least one epoxy compound.

4. A composition according to claim 1, wherein the stabilizer is at least one organotin compound.

5. A composition according to claim 1, wherein the stabilizer is at least one member selected from the group consisting of phosphite esters and epoxy compounds.

6. A composition according to claim 1, wherein the amount of the stabilizer is 0.1 to 5% by weight based on the total weight of the absorbent and the stabilizer.

7. A composition according to claim 1, wherein the absorbent is a compound of the formula:

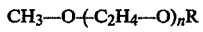

wherein R is CH₃; and n is an integer of 2 to 5.

8. A composition according to claim 2, wherein the phosphite ester is triphenyl phosphite or tris(nonylphenyl) phosphite.

9. A composition according to claim 3, wherein the epoxy compound is a compound having a glycidyl ether group or butylene oxide.

10. A composition according to claim 4, wherein the organotin compound is tetrabutyltin, tetraphenyltin or dibutyldisalicyltin.

11. A liquid absorbent for an absorption type refrigerator comprising
(a) an absorbent of polyethylene glycol methyl ether of the formula:

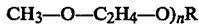

wherein R is hydrogen, CH₃—, or CH₃CO—; and n is an integer of 1 to 6, and
(b) at least one stabilizer selected from the group consisting of phosphite esters, epoxy compounds and organotin compounds.

12. A composition according to claim 2, wherein the phosphite ester is selected from the group consisting of trimethyl phosphite, triethyl phosphite, tripropyl phosphite, tributyl phosphite, tripentyl phosphite, trihexyl phosphite, triheptyl phosphite, tris(2-ethylhexyl) phosphite, triisooctyl phosphite, tridecyl phosphite, trilauryl phosphite, trimyristyl phosphite, tricetyl phosphite, tristearyl phosphite, trioleyl phosphite, distearylpentaerythritol diphosphite, diisodecylhydrogen phosphite, dilaurylhydrogen phosphite, dioleylhydrogen phosphite, dilaurylhydrogen phosphite, dioleylhydrogen phosphite, diisodecylpentaerythritol diphosphite, diphenylisodecyl phosphite, triphenyl phosphite, tris(4-phenylphenol) phosphite, tris(nonylphenyl) phosphite, diphenyl(tridecyl) phosphite, tricresyl phosphite, phenyldiisooctyl phosphite, diphenylnonylphenyl phosphite, phenylisodecyl phosphite, trixylenyl phosphite, phenyldiisodecyl phosphite, tris(cyclohexylphenyl) phosphite diphenyl phosphite, diphenylnonyl phosphite, di(nonylphenyl)nonyl phosphite and tetraphenyldipropylene glycol diphosphite.

13. A composition according to claim 1, wherein the halogenated hydrocarbon is one member selected from the group consisting of trichloromonofluoromethane, dichlorodifluoromethane, 1,1,1,2-tetrafluoroethane, monochlorodifluoromethane, dichloromonofluoromethane, monochloromonofluoromethane, monochloromethane, 1,1-difluoromethane, 1,2-dichlorotetrafluoroethane, 1,1-dichlorotetrafluoroethane, monochloroethane, monochloropentafluoroethane, hexafluoropropane, octafluorocyclobutane, 1-chloro-1,1,2-tetrafluoroethane and hexafluorocyclobutane and the phosphite ester is selected from the group consisting of trimethyl phosphite, triethyl phosphite, tripropyl phosphite, tributyl phosphite, tripentyl phosphite, trihexyl phosphite, triheptyl phosphite, tris(2-ethylhexyl) phosphite, triisooctyl phosphite, tridecyl phosphite, trilauryl phosphite, trimyristyl phosphite, tricetyl phosphite, tristearyl phosphite, trioleyl phosphite, distearylpentaerythritol diphosphite, diisodecylhydrogen phosphite, dilaurylhydrogen phosphite, dioleylhydrogen phosphite, diisodecylpentaerythritol diphosphite, diphenylisodecyl phosphite, triphenyl phosphite, tris(4-phenylphenol) phosphite, tris(nonylphenyl) phosphite, diphenyl-(tridecyl) phosphite, tricresyl phosphite, phenyldiisooctyl phosphite, diphenylnonylphenyl phosphite, phenylisodecyl phosphite, trixylenyl phosphite, phenyldiisodecyl phosphite, tris(cyclohexylphenyl) phosphite, diphenyl phosphite, diphenylnonyl phosphite, di(nonylphenyl)nonyl phosphite and tetraphenyldipropylene glycol diphosphite.

14. A composition according to claim 3, wherein said epoxy compound is a compound selected from the group consisting of bis(2,3-epoxycyclopentyl) ether, 2,2-bis(3,4-epoxycyclohexyl)propane, 1-phenoxy-2,3-epoxypropane, 1,2,5,6-diepoxy-4,7-hexahydromethanoindane, 2-(3,4-epoxy)cyclohexyl-5,5-spiro(3,4-epoxy)-cyclohexane-m-dioxane, 1,2-bis[5-(1,2-epoxy)-4,7-hexahydromethaneoxyl]ethane, 1,2-bis[5-(1,2-epoxy)-4,7-hexahydromethanoindaneoxyl]methane, 3,4-epoxy-6-methyl-cyclohexylmethyl-3,4-epoxy-6-methyl-cyclohexyanecarboxylate, 3,4-epoxy-cyclohexamethyl-(3,4-eposy)cyclohexane carboxylate, phenylglycidyl ether, 1,4-butanediolglycidyl ether, allylglycidyl ether, p-t-butylenyl-2,3-epoxypropyl ether, 2,3-epoxypropyl-p-methoxyphenyl ether, butylene oxide and 1-epoxyethyl-3,4-epoxycyclohexane.

15. A composition according to claim 4, wherein the organotin compound is a compound selected from the group consisting of tetraethyltin, tetrabutyltin, tetraphenyltin, dibutyldisalicyltin, di-n-octyltin malate, di-n-octyltin laurate, di-n-octyltin dilaurate, di-n-octyltinbis(2-ethylhexyl) malate, dibutyltin malate, dibutyltin laurate, dibutyltin dilaurate epoxy, dibutyltin diacetate, dibutyltindiisooctyl malate and dibutyltin dilaurate.

16. A composition according to claim 1, wherein said halogenated hydrocarbon has a boiling point of from −40° to +25° C.

17. A composition according to claim 16, wherein said composition consists essentially of the halogenated hydrocarbon as refrigerant, the polyethylene methyl ether as absorbent and 0.1 to 5% by weight of the at least one stabilizer based on a total weight of the absorbent and the stabilizer.

18. A liquid absorbent according to claim 11, wherein R is CH₃ and n is an integer of 2 to 5 and said at least one stabilizer is a phosphite ester selected from the group consisting of trimethyl phosphite, triethyl phosphite, tripropyl phosphite, tributyl phosphite, tripentyl phosphite, trihexyl phosphite, triheptyl phosphite, tris(2-ethylhexyl) phosphite, triisooctyl phosphite, tridecyl phosphite, trilauryl phosphite, trimyristyl phosphite, tricetyl phosphite, tristearyl phosphite, trioleyl phosphite, distearylpentaerylthritol diphosphite, diisodecylhydrogen phosphite, dilaurylhydrogen phosphite, dioleylhydrogen phosphite, diisodecylphentaerythritol diphosphite, diphenylisodecyl phosphite, triphenyl phosphite, tris(4-phenylphenol) phosphite, tris(nonylphenyl) phosphite, diphenyl(tridecyl) phosphite, tricresyl phosphite, phenyldiisooctyl phosphite, diphenylnonylphenyl phosphite, phenylisodecyl phosphite, trixylenyl phosphite, phenyldiisodecyl phosphite, tris(cyclohexylphenyl) phosphite, diphenyl phosphite, diphenylnonyl phosphite, di(nonylphenyl)nonyl phosphite and tetraphenyldipropylene glycol diphosphite.

19. An absorbent according to claim 18, wherein said absorbent consists essentially of the absorbent of polyethylene glycol methyl ether and at least one of the phosphite esters.

20. An absorbent according to claim 11, wherein said at least one stabilizer is selected from the group consisting of a phosphite ester selected from the group consisting of triphenyl phosphite and tris-(nonylphenyl) phosphite; an epoxy compound selected from the group consisting of an epoxy having a glycidal ether group and butylene oxide and an organotin compound selected from the group consisting of tetrabutyltin, tetraphenyltin and dibutyldisalicyltin.

* * * * *